United States Patent [19]

Kamiya et al.

[11] Patent Number: 5,040,223

[45] Date of Patent: Aug. 13, 1991

[54] FINGERPRINT VERIFICATION METHOD EMPLOYING PLURAL CORRELATION JUDGEMENT LEVELS AND SEQUENTIAL JUDGEMENT STAGES

[75] Inventors: Toshiharu Kamiya, Kariya; Kouzi Kawasaki, Anjo; Kazuyori Kawai, Toyohashi; Michinaga Nagura, Kariya; Osamu Eguchi, Kuwana, all of Japan

[73] Assignee: Nippondenso Co., Ltd., Kariya, Japan

[21] Appl. No.: 311,834

[22] Filed: Feb. 17, 1989

[30] Foreign Application Priority Data

Feb. 17, 1988 [JP] Japan ................................. 63-32640
May 11, 1988 [JP] Japan ............................... 63-112331

[51] Int. Cl.$^5$ ............................................. G06K 9/00
[52] U.S. Cl. ......................................... 382/4; 382/38
[58] Field of Search ................... 382/2, 4, 5, 37, 38; 356/71

[56] References Cited

U.S. PATENT DOCUMENTS

| | | | |
|---|---|---|---|
| 4,047,154 | 9/1977 | Vitols et al. | 382/38 |
| 4,246,568 | 1/1981 | Peterson | 382/4 |
| 4,537,484 | 8/1985 | Fowler et al. | 382/4 |
| 4,544,267 | 10/1985 | Schiller | 356/71 |
| 4,569,080 | 2/1986 | Schiller | 382/4 |
| 4,581,760 | 4/1986 | Schiller et al. | 382/4 |

FOREIGN PATENT DOCUMENTS 56-24675 3/1981 Japan .
58-176781 10/1983 Japan .

OTHER PUBLICATIONS

Cutaia, "Multilevel Character Recognition System", *IBM Tech. Disclosure Bulletin*, vol. 13, No. 12, May 1971, pp. 3739–3742.
"Fingerprint Verification System Using Pattern-Matching Algorithm" by Osamu Eguchi et al; PRU 88-83; pp. 65–72, 11/18/1988.

*Primary Examiner*—Leo H. Boudreau
*Attorney, Agent, or Firm*—Cushman, Darby & Cushman

[57] ABSTRACT

A method of fingerprint verification in which an input fingerprint is compared with a previously registered fingerprint, wherein the degree of correlation between a first section of the registered fingerprint and the input fingerprint is first determined by first-stage verification processing. If the correlation is higher than a first threshold value the input fingerprint is accepted, if lower than a second threshold value it is rejected, and if between these values, second-stage verification processing is executed in which a different section of the registered fingerprint is compared with the input fingerprint, and a final judgement made accordingly.

9 Claims, 5 Drawing Sheets

FINGERPRINT VERIFICATION METHOD EMPLOYING PLURAL CORRELATION JUDGEMENT LEVELS AND SEQUENTIAL JUDGEMENT STAGES

BACKGROUND OF THE INVENTION

1. Field of Applicable Technology

The present invention relates to a method of fingerprint verification which can be utilized, for example to control a keyless entry system, or for controlling entry to a special room such as a computer room.

2. Prior Art Technology

In the prior art, various types of apparatus for fingerprint verification have been envisaged whereby individuals can be respectively identified. Such an apparatus can be used, for example, to restrict entry through a door to one or more authorized individuals, whose fingerprints have been pre-registered and who must present a fingerprint to be recognized by the apparatus whenever entry is required.

An entry control system based on an identification apparatus which employs fingerprints must include a memory device having stored therein one or more registered fingerprints, i.e. respective fingerprint patterns for authorized individuals who have been registered beforehand. When entry is requested to such a system, a registered fingerprint pattern is read out from the memory device and the registered fingerprint pattern is compared with the input fingerprint pattern (i.e. that of the individual who is requesting entry), and a judgement is made as to whether or not the registered fingerprint matches the input fingerprint. With a system having a plurality of registered individuals, each of these generally must first identify himself or herself (e.g. by inputting a specific code number) when requesting entry, whereupon a corresponding registered fingerprint pattern is read out from the memory device to be compared with the input fingerprint.

In the prior art, various methods of implementing such a fingerprint verification apparatus have been envisaged. An example is given in Japanese Patent Laid-Open No. 56-24675. With that apparatus, the termination points and bifurcations of ridges in the fingerprint pattern are detected, as special points within the fingerprint. These points are referred to in the following as minutia. The mutual positional relationships of the minutia of a registered fingerprint and the minutia of an input fingerprint are compared, or the registered fingerprint and the input fingerprint are compared based upon the numbers of ridges which exist between minutia. Verification is thereby executed, indicating whether or not the input fingerprint is the same as the registered fingerprint.

In a method of fingerprint verification described in Japanese Patent Laid-Open No. 58-176781, or the Communications Institute Research Paper PRU87-31, a method of pattern matching for fingerprint verification is proposed which focusses upon portions of the fingerprint pattern in the vicinity of the minutia.

However with such a method of fingerprint verification, since the operation is based on detecting the minutia beforehand and executing verification with these minutia as a reference, problems will arise if the input fingerprint is of poor quality, i.e. if the surface of the input finger is rough, or a portion of the finger surface is of concave shape. In such a case, breaks in the fingerprint ridges appearing in the input fingerprint image will be produced, making it difficult to reliably detect these minutia. Thus, only a low degree of verification reliability is achieved.

Another prior art method of fingerprint verification is disclosed in U.S. Pat. No. 4,581,760. In that method, a pair of small segments of a registered fingerprint are held stored in memory, and are compared with respective portions of an input fingerprint image when verification is required. The registered fingerprint segments and input fingerprint portions are processed in the form of arrays of 2-state pixels (picture elements). Comparison is executed by finding four positions for the registered fingerprint segments relative to the input fingerprint portions, i.e. positions at which there is maximum correlation between the black-state pixels of one registered fingerprint segment and one of the input fingerprint portions, between the white-state pixels of that registered fingerprint segment and input fingerprint portion, between the black-state pixels of the other registered fingerprint segment and the other input fingerprint portion, and between the white-state pixels of that registered fingerprint segment and input fingerprint portion. The criteria for accepting or rejecting an input fingerprint are essentially based upon the mutual relationships of these four positions, however some other additional checking criteria are described by the inventor.

The reason for utilizing a number of different criteria for verifying an input fingerprint with the apparatus of the latter patent, rather than simply making a decision based upon whether a number of mutually coinciding pixels (i.e. a correlation value) is above a certain threshold level, is in order to increase the rate of correct identifications while reducing the rate of incorrect identifications and of incorrect rejections. However it appears that the invention does not in fact provide, in itself, a solution to this problem, since the inventor states that "substantial improvements" in such identification errors can be attained if cascading of two separate fingerprints (i.e. by the individual requesting access) is utilized, and if the individual receives training and practice in placing his or her finger carefully on the platen (of the input photo-rejector).

In this respect, the apparatus of the above patent utilizes comparison of the registered fingerprint segments with only the aforementioned small portions (referred to as "domains") of the input fingerprint, rather than comparing these registered fingerprint segments with the entire input fingerprint. This is done in order to reduce the time required for verification since comparison between each registered fingerprint segment and an input fingerprint domain is executed by sequentially moving a registered fingerprint segment, one pixel at a time, within domain boundaries, and computing the correlation value at each position thus attained. Each position of maximum correlation can then be computed.

Thus, with a prior art method of fingerprint verification in which checking of fingerprint minutia is utilized, the disadvantage arises that satisfactory operation is not attainable if a fingerprint which is to be verified is of poor quality. On the other hand, with a prior art method of fingerprint verification in which each fingerprint is divided into small pixels, and comparison is executed by moving a registered fingerprint relative to an input fingerprint, in steps of pixel units, the disadvantage arises that excessive time is required to execute verification, irrespective of whether the input fingerprint is of poor or of excellent quality, and irrespective of whether the input fingerprint is widely different from the registered fingerprint or contains regions of similarity to the registered fingerprint.

Furthermore with all of these prior art methods of fingerprint verification, achievement of a high overall verification rate (with a low rate of incorrect rejections of input fingerprints) is incompatible with achieving a low rate of incorrect acceptance.

SUMMARY OF THE INVENTION

It is an objective of the present invention to overcome the problems of the prior art described above, by providing a method of fingerprint verification apparatus whereby it is not necessary to execute detection of fingerprint minutia, so that even in the case of an input fingerprint image which is of low quality (i.e. having a large number of cuts or other damage to the fingerprint ridges), a satisfactory degree of verification reliability can be achieved.

It is a further object of the invention to provide a method of fingerprint verification whereby a high overall verification rate and a low rate of incorrect rejections of input fingerprints can be achieved, together with a negligibly low rate of incorrect identification.

It is moreover an object of the present invention to provide a method of fingerprint verification whereby the average speed of verification can be made high, by ensuring that an incorrect input fingerprint which can be readily judged as being incorrect will be rapidly rejected in an early stage of verification, and whereby detailed checking of an input fingerprint is only executed when judgement is difficult, e.g. due to the input fingerprint being of poor quality and/or containing regions of similarity to a registered fingerprint.

The operation of a method of fingerprint verification according to the present invention is as follows. Prior to utilizing the fingerprint verification apparatus, a primary window region (i.e. a rectangular segment) and at least one secondary window region (positioned to one side of the primary window region) of a fingerprint of an authorized individual are converted into respective arrays of pixels, each of which can take a white or a black state (referred to in the following as the "1" and the "0" state respectively) corresponding to fingerprint ridge and valley regions respectively, and stored in this form in a memory device. When verification is required, the input fingerprint is first converted to an array of pixels, and temporarily stored in memory. Data operations are then executed whereby the primary window region of the registered fingerprint is in effect displaced relative to the input fingerprint by successive position shifts until a position is found at which optimum matching (i.e. maximum correlation) occurs between the primary window region of the registered fingerprint and the input fingerprint. This degree of correlation is then measured, as a number of mutually non-corresponding pixels. A judgement is then made as to whether the degree of correlation is within a first range, indicating that the input fingerprint is definitely accepted as identical to the registered fingerprint, within a second range, indicating that the input fingerprint is definitely rejected as different from the registered fingerprint, or within a third range, indicating that definite judgement at that stage is not possible. If the degree of correlation is within that third range, then a second stage of position matching and measurement of correlation is executed utilizing the (at least one) secondary window region, in a similar, manner to that described for the first window region. If the degree of correlation found in this second stage is above a specific threshold value, then the input fingerprint is accepted, while if it is below that threshold value, the input fingerprint is rejected.

More specifically, the present invention provides a method of fingerprint verification in which fingerprint regions are processed as data representing pixel arrays, each pixel taking a first state corresponding to a fingerprint ridge or a second state corresponding to a fingerprint valley, the method comprising steps of:

(a) providing a primary window region of a registered fingerprint image of a registered individual, said primary window region being situated in a region of said registered fingerprint image, and at least one secondary window region of said registered fingerprint image, said secondary window region being at least partially outside said primary window region;

(b) providing an input fingerprint image which is to be verified for correspondence with said registered fingerprint image;

(c) executing first-stage verification processing by finding a region of said input fingerprint image which has maximum correlation with said primary window region of the registed fingerprint image, said region of the input fingerprint image being configured in accordance with said primary window region, and measuring a degree of said correlation;

(d) making a judgement of said degree of correlation based on predetermined parameters and, if said degree of correlation is judged to be within a predetermined low range, accepting said input fingerprint image as corresponding to said registered fingerprint image and terminating processing, if said degree of correlation is judged to be within a predetermined high range, rejecting said input fingerprint image and terminating processing, and if said degree of correlation is judged to be within a range such that a definite decision on acceptance or rejection of said input fingerprint image is difficult to attain, proceeding to second-stage verification processing;

(e) executing said second-stage verification processing by finding a second region of said input fingerprint image which is configured in accordance with and has maximum correlation with said secondary window region of the registed fingerprint image, and measuring a degree of said correlation; and (f) making a decision as to acceptance or rejection of said input fingerprint image, based upon said degree of correlation obtained in said step (e).

DESCRIPTION OF PREFERRED EMBODIMENTS

Figure 1:
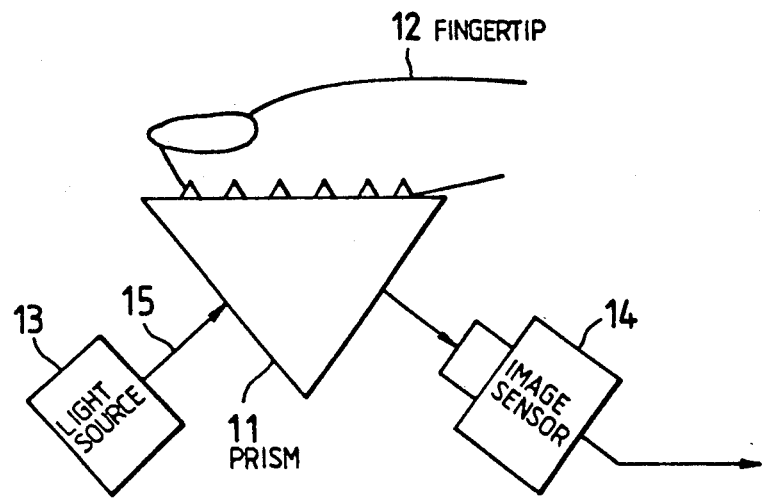
FIG. 1 shows an example of a photo-receptor for a fingerprint verification apparatus to implement the method of the present invention.

A fingerprint verification apparatus for implementing a first embodiment of the method of the present invention will be described in the following referring to the drawings. FIG. 1 shows an example of a photo-receptor which is suitable for inputting a fingerprint to this apparatus. Light 15 emitted from a source 13 is reflected within a prism 11 from a surface of the prism 11 upon which is placed a surface of a finger 12. The resultant light which emerges from the prism 11 is received by an image sensor 14, with ridges and valleys (between ridges) of the fingerprint of the finger 12 being received as dark and light regions by the sensor 14, and a corresponding image signal is produced from the image sensor 14.

Figure 2:
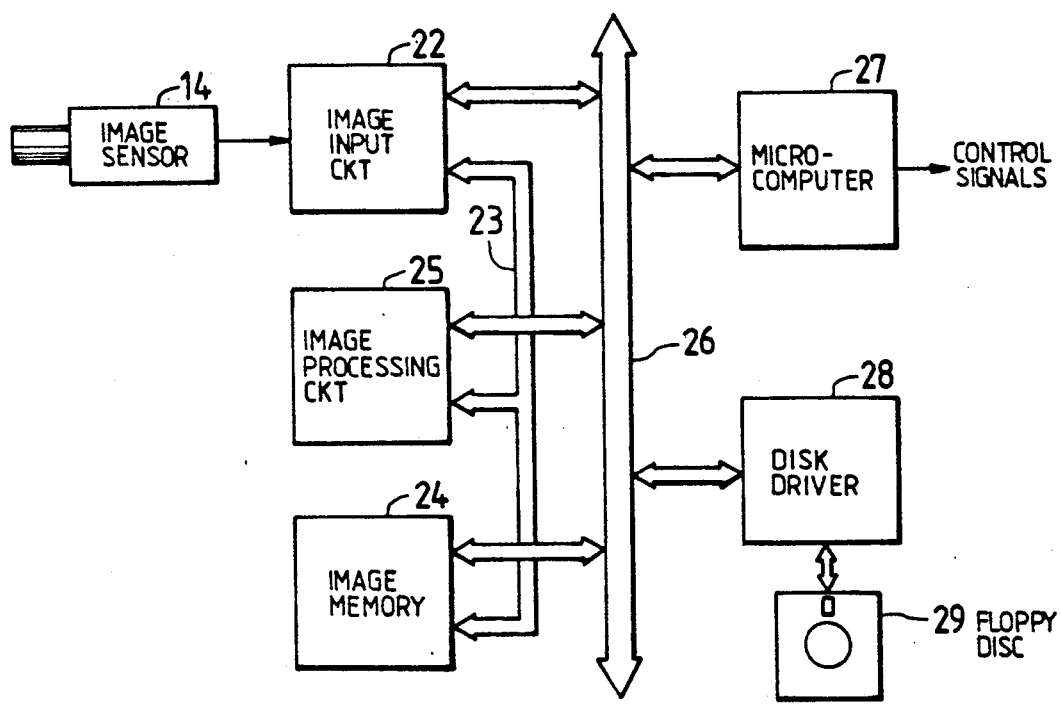
FIG. 2 is a general block diagram of an example of a fingerprint verification apparatus for implementing the method of the present invention.

FIG. 2 is a block diagram showing the general configuration of this apparatus. An image processing circuit 25 executes verification processing operations. An image input circuit 22, an image memory 24 and the image processing circuit 25, etc, are connected via a control bus 26 to a microcomputer 27, which controls these circuits. Processing results are outputted from the image processing circuit 25 and supplied to the microcomputer 27, which responds by issuing appropriate command signals to external equipment. For example in a room entry control system, the microcomputer 27 could issue a command for enabling unlocking of a door, if the processing results supplied from the image processing circuit 25 indicate that an input fingerprint has been accepted as corresponding to a registered fingerprint.

The control bus 26 (which can transfer both commands and data) is also connected through a disc driver 28 to a floppy disc 29 which functions as an external memory device. The floppy disc 29 is used to store registered fingerprint data for verification processing, results of verification processing, a control program, etc. The image input circuit 22, image processing circuit 25 and image memory 24 can also exchange data via an image bus 23.

A fingerprint that is inputted as an image signal from the sensor 14, as described above, is supplied to an image input circuit 22, and is converted into data in which the fingerprint image is represented as an array of pixels (i.e. picture elements) each of which takes either a "1" (white) state or a "0" (black) state, in accordance with whether the corresponding portion of the fingerprint image is part of a valley or part of a ridge in the fingerprint pattern. Prior to using the apparatus, the fingerprint data for at least one authorized individual are obtained as described above, and transferred as an image output signal corresponding to the input fingerprint image, from the image input circuit 22 over the control bus 26 through the floppy disc driver 28 to be stored as a registered fingerprint image on the floppy disc 29. For simplicity of description, the following description will refer only to a single registered fingerprint image, although of course a plurality of these can be stored on the floppy disc 29.

With this embodiment of the invention the microcomputer 27 extracts, from the registered fingerprint image, data representing a plurality of sections of that fingerprint image, these sections being referred to in the following as window regions. These are a primary window region, which is situated in a main central region of the fingerprint image, and at least one secondary window region situated to the side of the primary window region. The term "main central region", as used herein, designates for example a region surrounding the center of the whorls of a fingerprint. In the description of this embodiment it will be assumed that one primary window region and two secondary window regions are utilized, as described in detail hereinafter. These are stored as the aforementioned registered fingerprint image on the floppy disc 29.

Subsequently, when fingerprint verification is to be executed, an input fingerprint image is supplied to the image input circuit 22 and converted to data representing a pixel array. These data are transferred as an image signal, via the image bus 23 to the image memory 24, and temporarily stored therein. In addition, the primary window region and secondary window regions of the registered fingerprint image are read out from the floppy disc 29 and stored in a section of the image memory 24. The fingerprint data thus stored in the image memory 24 are subsequently transferred, as required, via the image bus 23 to the image processing circuit 25.

Figure 3:
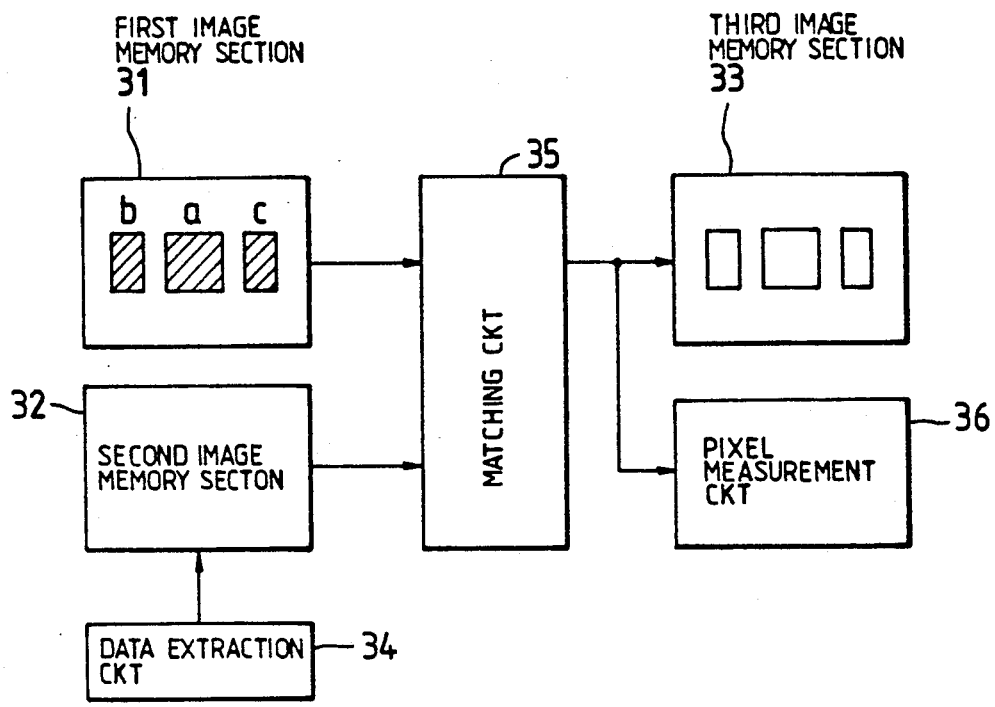
FIG. 3 is a block diagram showing details of memory and data processing circuits of the apparatus of FIG. 2.

FIG. 3 shows details of the configuration of the image processing circuit 25 and the image memory 24 of this fingerprint verification apparatus. The image memory 24 includes a first image memory section 31, used for storing the primary window region and secondary window regions of a registered fingerprint image (transferred from the floppy disc 29), a second image memory section 32 which is used for storing an input fingerprint image while executing a verification operation, and a third image memory section 33 for storing results obtained during verification processing.

As mentioned above, the first image memory section 31 stores fingerprint image data for a primary window region, designated as window region a, which constitutes a main central region of the registered fingerprint image. The first image memory section 31 also has stored therein data corresponding to the two secondary window regions, designated as window regions b and c respectively, which are respectively positioned on either side of the primary window region a as illustrated in FIG. 3.

At the time of executing verification, data for a region of the input fingerprint image, corresponding in size and shape to the primary window region a, are extracted from the input fingerprint image stored in the second image memory section 32 and supplied to the matching circuit 35. This extraction of input fingerprint image primary window region data is executed in response to commands issued by a data extraction circuit 34. In addition, data for the first window region a of the registered fingerprint image are obtained from the first image memory section 31, and are supplied to the matching circuit 35. Matching, i.e. measurement of correlation between the window region a of the registered fingerprint image and the extracted window region of the input fingerprint image, is then executed. This is performed by the matching circuit 35, which derives the exclusive-OR logic sum of each of pairs of correspondingly positioned pixels of the two window regions supplied thereto. The number of these pixel pairs which do not mutually correspond in state (i.e. "1" or "0" state) is then counted by the pixel measurement circuit 36, and the resultant count value of the exclusive-OR logic sum is stored in the third image memory section 33.

The data extraction circuit 34 then extracts a differently positioned window region from the input fingerprint image held in memory section 32, by a step position shift of fixed magnitude, and the above process is repeated. Such successive data extraction operations are equivalent to step position changes of the window region a of the registered fingerprint image relative to the input fingerprint image, and will be referred to in that way in the following, for simplicity of description.

These successive steps of comparison processing are continued until a predetermined region of the input fingerprint image has been compared with the primary window region a of the registered fingerprint image. A position of the primary window region a of the registered fingerprint image within the input fingerprint image is thereby found at which optimum correlation is achieved. This is obtained as a position such that any step shift from that position will result in a greater number of mutually non-corresponding pixels being produced than the number of mutually non-corresponding pixels produced at the current position.

The amount of position shift of the primary window region a of the registered fingerprint image relative to the input fingerprint image which is necessary in order to reach that optimum position is then obtained and stored in a RAM of the microcomputer 27. When this position of maximum correlation for the primary window region a has thus been found, the number of number of mutually non-corresponding pixels at that position of the primary window region a relative to the input fingerprint image has of course been counted by the pixel measurement circuit 36, and stored in the RAM of the microcomputer.

When fingerprint pattern matching is executed in this way, the greater the area of the images which are to be matched, the lower will become the rate of erroneous acceptance i.e. the lower will be the rate of erroneous judgement of a matching condition. However when a fingerprint image is inputted, it is difficult to arrange that the position of the input fingerprint image and the position of the registered fingerprint image will be mutually aligned. Furthermore since the finger tip having the fingerprint that is to be verified is soft and flexible, there will be some distortion of the shape of the input fingerprint image. For this reason, if a reduction of the rate of erroneous acceptance is attempted only by increasing the size of the regions to be matched, e.g. by increasing the size of the window region a described above, then the overall rate of verification will not be improved, i.e. there will be no improvement in the rate of incorrect rejection of input fingerprints. This is the essential basis for the improvement in verification reliability provided by the method of the present invention, by comparison with a prior art method in which a plurality of window regions of the input and the registered fingerprint are compared in parallel.

For that reason, with the method of fingerprint verification according to the present invention, verification is executed in at least two stages. With this first embodiment, the first stage consists of the processing operations described above whereby the primary window region a of the registered fingerprint is moved with respect to the input fingerprint to a position of maximum correlation by the successive stepping operation described above, whereupon the degree of correlation is measured by counting the number of mutually non-corresponding pixels. This number is then compared with two different decision threshold values. If the number of mutually non-corresponding pixels is found to be in a high correlation range which is below a lower one of these threshold values, then it is judged that the input fingerprint matches the registered fingerprint, i.e. a positive verification result is reached, and no further processing takes place. If the number of number of mutually non-corresponding pixels is found to be in low correlation range, which is higher than a higher one of the two threshold values, then it is judged that the input fingerprint does not match the registered fingerprint, i.e. the application is rejected, with no further processing. However if the number of number of mutually non-corresponding pixels is within a range between these two threshold values, then this is taken to indicate that a definite judgement cannot be reached at that stage, and second-stage verification processing using the secondary window regions is then initiated. However this second-stage processing is started with the primary window region a of the registered fingerprint image shifted to the aforementioned position of maximum correlation. This is a basic feature of the method of the present invention, whereby the rate of erroneous acceptance is reduced (due to the effectively increased total area used for verification, i.e. the sum of the areas of the primary window region a and the two secondary window regions b and c), together with an increase in the overall rate of acceptance due to the re-positioning of the window regions in a manner determined in the first-stage processing. That is to say, this re-positioning will lead to improved alignment of a correct input fingerprint, and hence an improved probability of acceptance, but will have no effect upon the probability of acceptance of an incorrect input fingerprint.

The above points will be described in greater detail referring to FIG. 4, which graphically illustrates the relationships between the overall rate of acceptance (i.e. the ratio of number of attempts at verification to the number of successful verifications), the rate of erroneous acceptance, and the aforementioned number of number of mutually non-corresponding pixels . Curve A shows the manner of variation of the overall rate of acceptance with respect to the number of mutually non-corresponding pixels, while curve B shows the corresponding relationship for the rate of erroneous acceptance. If, as in the prior art, a single judgement threshold value N2 were to be utilized, then although the overall rate of acceptance could be made fairly high, there would in fact be a substantial number of cases of erroneous verification, i.e. erroneous acceptance of an incorrect fingerprint. This is due to the fact that a number of factors can cause the degree of correlation (in this case, indicated by the number of mutually non-corresponding pixels) to be incorrectly judged to some extent. If the judgement threshold value is reduced below the value N1, then the rate of incorrect verification will be reduced, however the overall rate of acceptance will be unsatisfactory (i.e. in many instances, an input fingerprint will be erroneously rejected). Conversely, an increase in the value of N3 would of course result in an increased overall rate of acceptance, but also an increased rate of erroneous acceptance, so that the reliability of identification will be poor. Thus, an increase in the identification rate and a decrease in the erroneous verification rate are inversely related, so that this problem cannot be solved merely by adjusting a single judgement threshold value.

For that reason, with a method of fingerprint verification according to the present invention, in order to enable the identification rate to be increased while at the same time decreasing the rate of erroneous identification, 2-stage verification is utilized as mentioned above. Instead of using only a single registered fingerprint image corresponding to the primary window region a as in the prior art, this embodiment further utilizes secondary window regions b and c of the registered fingerprint image, which are positioned on each side of the primary window region a.

Figure 4:
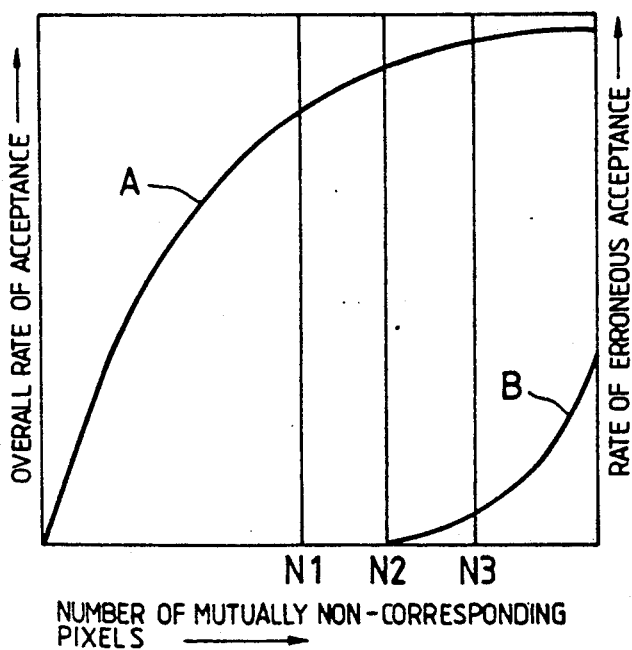
FIG. 4 graphically illustrates relationships between correlation value decision thresholds, an overall rate of verification, and a rate of incorrect verification.

With the present invention, both of the judgement threshold values N1 and N3 shown in FIG. 4 are utilized. Designating the number of mutually non-corresponding pixels which are found by the first-stage verification processing described above as $N_A$, then if $N_A$ is lower than the judgement threshold value N1, it is judged that the input fingerprint matches the registered fingerprint (i.e. a positive verification result), and no further action is taken. If the number of mutually non-corresponding pixels $N_A$ is higher than the judgement threshold value N3, then it is judged that the input fingerprint and the registered fingerprint do not match (i.e. a negative verification result). However, if the number of mutually non-corresponding pixels $N_A$ is between the judgement threshold values N1 and N3, then this is taken to indicate that judgement is not possible in the first-stage verification process, and second-stage verification processing is then executed. This is done by using the registered fingerprint images for the secondary window regions b and c. Specifically, the the secondary window regions b and c of the registered fingerprint image are read out from the first image memory section 31, while two window region corresponding (i.e. in respective positions within the input fingerprint image) to these secondary window regions b and c are extracted from the input fingerprint image by the data extraction circuit 34. Initially, the respective positions of the secondary window regions b and c are set in accordance with the aforementioned repositioning of the primary window region a for optimum correlation by an amount and direction established in the first-stage processing described above, i.e. with each of the secondary window regions b and c having been displaced by the same amount and in the same direction as the displacement applied to the primary window region a to reach that position of substantially optimum correlation. The operations described above for first-stage processing using the primary window region a are then repeated for the secondary window regions b and c. That is, first a position of the secondary window region b relative to the input fingerprint image is searched for (starting from the aforementioned initial displaced position) at which maximum correlation is found, and the number of number of mutually non-corresponding pixels for the secondary window region b at the position of maximum correlation is counted by the pixel measurement circuit 36 to obtain a count value $N_B$. These operations are then repeated for the secondary window region c, and the number of number of mutually non-corresponding pixels for the secondary window region c are counted, to obtain a count value $N_C$. A final decision as to whether the input fingerprint is accepted or rejected is then made, by comparing the count values thus obtained for the secondary window regions b and c with a judgement threshold value N4 which is different from the judgement threshold values N1 and N3 used in the first-stage verification processing described previously. Specifically, if both $N_B$ and $N_C$ are found to be lower than the judgement threshold value N4 then it is judged that the input fingerprint is identical to the registered fingerprint.

The registered fingerprint images for the secondary window regions b and c are mutually displaced from the primary window region a (generally used in the prior art) by a predetermined distance. As stated above, utilizing such secondary window regions in this way is equivalent to expanding the area which is used for fingerprint image verification. If the input fingerprint is identical to the registered fingerprint, then even if the input fingerprint image is distorted to some extent in shape, the first stage verification processing will result in the registered fingerprint image becoming positioned to most closely match the input fingerprint image. In that case, in general, the count value $N_A$ will be found to be below the judgement threshold value N1, so that the input fingerprint will be accepted as verified, and processing then terminated. However if the input fingerprint image is of poor quality, then the count value $N_A$ may be found to be in the range between the judgement threshold values N1 and N3. Second stage verification processing is then performed in that case, with the secondary window regions b and c initially respectively aligned for closest matching with the input fingerprint as determined from the results of the first-stage processing.

If the input fingerprint image is actually that of an individual who does not correspond to the registered fingerprint image, then even if the a region of the input fingerprint image is coincidentally found to correspond to the primary window region a of the registered fingerprint, such that it is found during the first-stage verification that the number of mutually non-corresponding pixels $N_A$ is within the range between the judgement threshold value N1 and N3, then it will be judged in the second-stage verification process that the fingerprints do not match. This is due to the fact that although there is a possibility of coincidental similarity of a small region of an incorrect input fingerprint to the primary window region a of the registered fingerprint, there is a negligible possibility that there will be such similarity between each of the secondary window regions b and c of the registered fingerprint image and two regions of the input fingerprint image. Thus the possibility of erroneous identification is made extremely small, i.e. referring to FIG. 4 again, the rate of erroneous acceptance is substantially equivalent to that obtainable using a judgement threshold value as low as N1, whereas the overall rate of acceptance is that which would be obtained with a judgement threshold value as high as N3.

It can thus be understood that this two-stage, triple judgement threshold value basis of the method of the present invention enables both a high rate of overall acceptance (with a low proportion of incorrect rejections) and a low rate of erroneous acceptance to be achieved.

Figure 5:
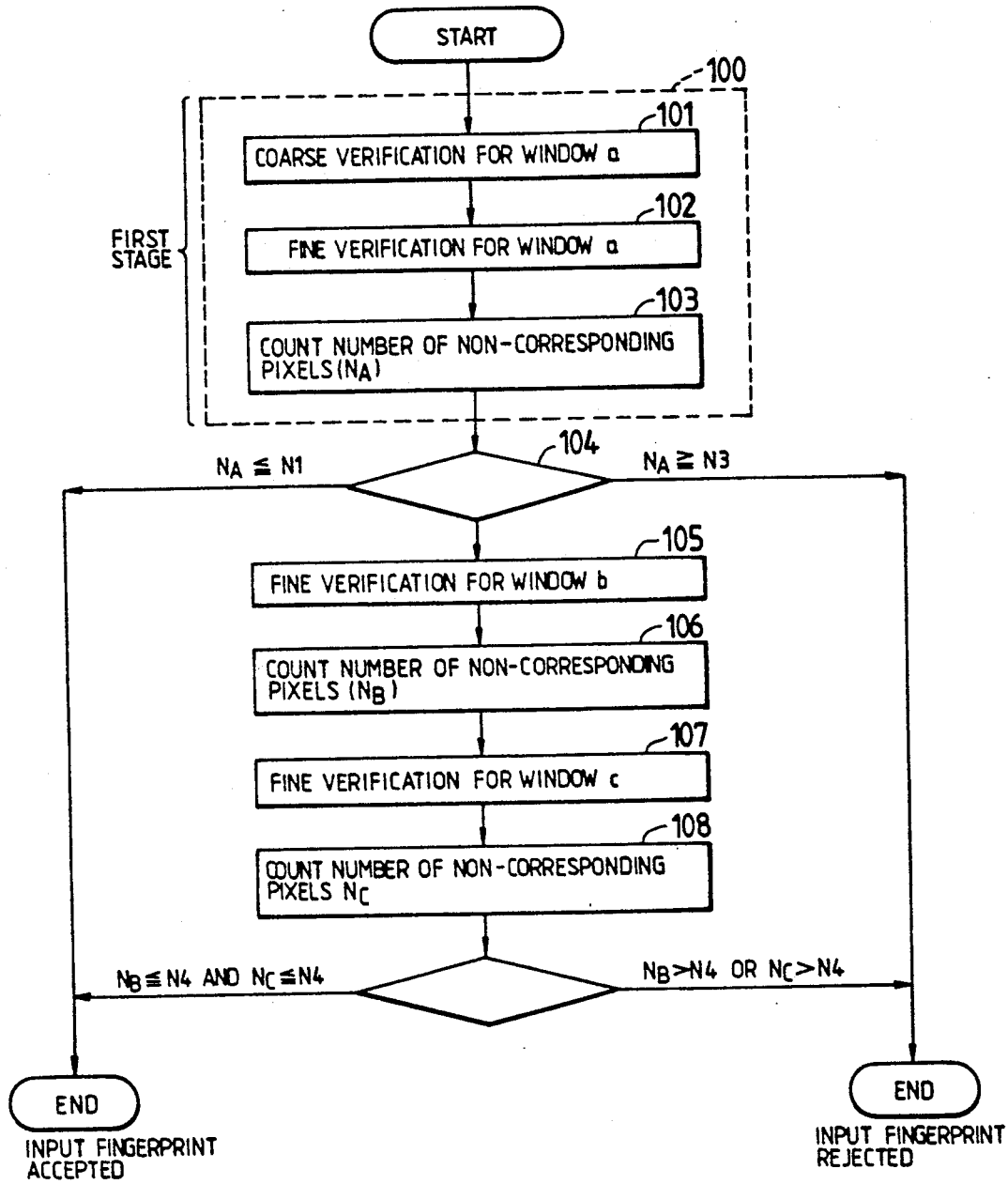
FIG. 5 is a flow chart for assistance in describing the operation of a first embodiment of a method of fingerprint verification according to the present invention.

FIG. 5 is a flow diagram for illustrating the above verification operation. When verification is started, step 101 is first executed whereby coarse matching of the fingerprint images is performed for the first window region a. This is done in order to increase the speed of verification processing, i.e. since it is necessary to search a large region of the input fingerprint image (since that image may be substantially mis-positioned), an excessive time would be required if stepwise comparison were to be executed in units of pixels. In step 101 therefore, instead of successively comparing the primary window region a of the registered fingerprint image with the input fingerprint image by shifting the primary window region a in steps of pixel units, the window is moved in steps of substantially greater magnitude, so that substantially the entire area of the input fingerprint image can be rapidly scanned to find an approximate position of optimum correlation between the primary window region a of the registered fingerprint image and the input fingerprint image. Specifically, in step 101 the first window region a is moved with respect to the input fingerprint image in successive steps of a specific coarse pitch which is substantially greater than the pitch of the pixels, by step movement upwards, downwards, to the left or to the right, as required. The terms "upwards", "downwards", "left" and "right" as used here signify directions parallel to rectangular axes of the pixel array forming a window region. This coarse pitch is preferably selected to be approximately ½ of the pitch of the fingerprint ridges. This operation is continued until substantially the entire region of the input fingerprint image has been compared with the primary window region a, with a number of mutually non-corresponding pixels having been counted, as described hereinabove, following each of these coarse-pitch position shifts. Processing of the set of count values thus obtained is then executed, to find an optimum correlation position of the window region a of the registered fingerprint image relative to the input fingerprint image, at which the number of non-corresponding picture elements is smallest. This is of course equivalent to finding a region of the input fingerprint image, which is of identical configuration to the primary window region of the registered fingerprint image and exhibits maximum correlation with that window region.

The amount of displacement of the window region a of the registered fingerprint image that is required to shift the window from its initial position relative to the input fingerprint image (prior to beginning the coarse verification processing) to that position of optimum correlation, is thus obtained.

With this amount of position displacement having been applied in step 101, operation proceeds to a step 102 in which fine verification processing is executed. In step 102, as in step 101, the primary window region a of the registered fingerprint image is moved by one step at a time from an initial position (i.e. from the aforementioned position of optimum correlation) upward and downward and to the left and to the right, with the pitch of these displacement steps in this case being equal to the pitch of the pixels. At each step, the number of number of mutually non-corresponding pixels between the primary window region a of the registered fingerprint image and the input fingerprint image is determined. That is, for example, the primary window region might be first moved upwards by successive fine-pitch steps until a step is reached at which any further upward stepping will result in a greater number of mutually non-corresponding pixels than the current position of that window region. The window region might then be similarly stepped to the right, until a step is reached at which any further rightward stepping will result in a greater number of mutually non-corresponding pixels than the current position. This process would then be repeated for downward stepping and leftward stepping, and is continued until an optimum correlation position of the registered fingerprint image relative to the input fingerprint image. That is a position such that any step movement of the primary window region a from that position, to the left or right, or upward or downward, will result in a greater number of mutually non-corresponding pixels being produced between the input fingerprint image and the window region a of the registered fingerprint image than the number of mutually non-corresponding pixels at the current position. The amount of position displacement which has been applied to the primary window region a of the registered fingerprint image relative to the input fingerprint image to reach that condition, from the initial position of the registered fingerprint image (prior to step 101) is then obtained and stored in the memory of the microcomputer 27.

The basic principles of the above method of matching one fingerprint pattern to another, by successive steps of one pattern relative to the other in units of pixels, are known in the prior art, as described in U.S. Pat. No. 4,581,760.

Although this fine verification processing takes place by shifting the window region a in units of pixel size, the predetermined area of the registered fingerprint image within which this displacement of the window region a takes place can be made substantially smaller than the search area used in the coarse verification step 101, so that the fine verification processing can be rapidly executed. This is made possible since an approximate position of optimum correlation between the registered fingerprint image and the input fingerprint image has been found in the coarse verification step 101, thereby compensating for any substantial displacement of the input fingerprint image due to incorrect placement of the fingertip on the image sensor 14.

In the succeeding step 103, the number of mutually non-corresponding pixels for the current position of the primary window region a, designated as $N_A$, is obtained.

In the next step 104, the number of mutually non-corresponding pixels $N_A$ that has been obtained in step 103 is compared with a first judgement threshold value N1 (shown in FIG. 3), as a first judgement processing operation. If it is judged in step 104 that $N1 < N_A < N3$, then operation proceeds to step 105 of second-stage verification processing. If it is found that $N_A \leq N1$, then it is judged that a fingerprint match has been found, i.e. a positive verification result is outputted, and processing is terminated. If $N_A \geq N3$, then it is judged that the fingerprints do not match, i.e. a negative verification result is produced, and processing is terminated.

The above series of operational steps 101 through 103 (collectively designated as processing stage 100) constitute the first-stage verification processing. It can be understood that if it is found in the judgement step 104 that a definite decision cannot be achieved from this first-state processing (i.e. the number of number of mutually non-corresponding pixels is within the range between N1 and N3 shown in FIG. 4), then second-stage verification processing is initiated as follows.

In step 105, fine verification is executed using the secondary window region b of the registered fingerprint image. This verification processing begins with the secondary window region b having been shifted relative to the input fingerprint image by the final amount of position displacement obtained in step 102 as described above. A position of optimum correlation between the secondary window region b and the input fingerprint image is found, as in step 102, by displacing the secondary window region b by successive steps of pixel units, as described for step 102 above, to find a position of optimum correlation between the secondary window region b of the registered fingerprint image and the input fingerprint image. In step 106, the number of mutually non-corresponding pixels obtained as a result of this fine verification processing is obtained. Next, in step 107 as in step 105 described above, fine verification of the secondary window region c of the registered fingerprint image with respect to the input fingerprint image is performed, and in step 108 the number of mutually non-corresponding pixels $N_C$ at the optimum correlation position thus obtained for the window region c is counted.

A second judgement operation is then executed in step 109, in which the numbers of mutually non-corresponding pixels $N_B$ and $N_C$ are respectively compared with a judgement threshold value N4. If it is found that $N_B \geq N4$, or if $N_C \geq N4$, then a negative verification result is outputted. If it is found that $N_B \leq N4$ and also $N_C \leq N4$, then a positive verification result is outputted, i.e. the input fingerprint is accepted.

Steps 105 through 108 thus constitute the second-stage verification processing referred to hereinabove. In the embodiment described above, during the second-stage verification processing, two secondary window regions b and c are utilized which are disposed on each side of the primary window region a, which is the main region for verification operation. Numbers of mutually non-corresponding pixels are counted for each of these secondary window regions b and c respectively. However it is not essential to use both of these secondary window regions b and c, and it would be equally possible to use only either one of these, while attaining a sufficiently high degree of reliability for the verification results.

Second embodiment

Figure 6:
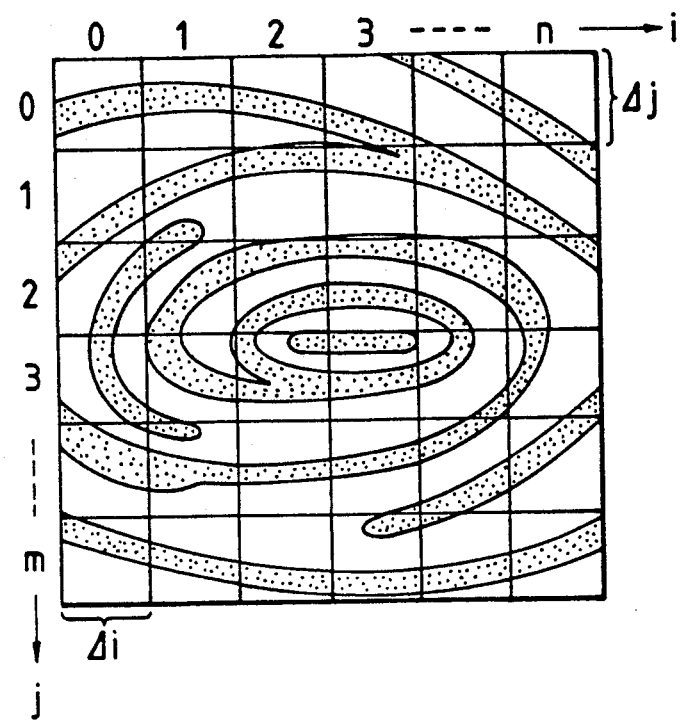
FIG. 6 illustrates an example of a fingerprint pattern within a window region which is divided into an array of window segments, for assistance in describing a second embodiment of the present invention.

Before executing verification of an input fingerprint image, by comparing that image with regions of a registered fingerprint image, it is necessary to adjust the relative positions of the registered fingerprint image and input fingerprint image such as to compensate for any positional misalignment of the input fingerprint image. That is, even if the input fingerprint image is identical to the registered fingerprint image, the person requesting verification may place his or her fingertip on the image sensor at a different position from the position used at the time of registering the fingerprint. In the first embodiment described above, this position adjustment is rapidly performed by executing a first displacement of the primary window region a in the coarse verification step 101, followed by a further displacement in the fine verification step 102. A second embodiment of the invention will be described in which this position adjustment between the input fingerprint image and registered fingerprint image can be executed with greater accuracy and rapidity, referring first to FIG. 6. With this embodiment, as illustrated in FIG. 6, the registered fingerprint image (processed as data corresponding to a pixel array) is divided into an array of small regions, referred to in the following as window segments, with the horizontal and vertical coordinate axes of this array being designated as the i and the j axis respectively. The fingerprint image is divided into (n+1) window segments along the i axis, and (m+1) window segments along the j axis. Each of these window segments has a width $\Delta i$ and a height $\Delta j$, each of which corresponds to an integral number of pixels. An input fingerprint image is similarly divided into such an array of window segments.

In an initial step of positioning and verification, the numbers of pixels which are in the white state (i.e. the "1" state) within respective ones of these window segments of the input fingerprint image are counted. Similarly, the numbers of pixels that are in the white state within respective window segments of the registered fingerprint image are counted. Designating the numbers of pixels which are in the white state within the window segments of the registered fingerprint image as a numeric array $P_R(i, j)$, i.e. a set of values $P_R(i_0,j_0), \ldots, P_R(i_n,j_m)$, and the numbers of pixels which are in the white state within the window segments of the input fingerprint image as a numeric array $P_V(i, j)$, the amount of position displacement between the registered fingerprint image and the input fingerprint image is computed by deriving respective values $(i_o, j_o)$ which result in a minimum value being achieved for a position displacement function $S(i_o, j_o)$. This position displacement function is given by equation (1) below.

$$S(i_o, j_o) = \Sigma |P_V(i, j) - P_R(i+i_o, j+j_o)|/N \quad (1)$$

where $$N = \Sigma \Delta i \cdot \Delta j \quad (2)$$

The limits of the sum $\Sigma$ are set as:

$$\Sigma = \sum_{\substack{i=\max(0, i_o) \\ j=\max(0, j_o)}}^{\substack{i=\min(n, n+i_o) \\ j=\min(m, m+j_o)}} \quad (3)$$

(where $-n \leq i_o \leq n$, and $-m \leq j_o \leq m$)

The amount of position displacement (Si, Sj) with respect to the i and j axes, between the input fingerprint image and the registered fingerprint image, (i.e. expressing a vector position shift) is then obtained from the following equations:

$$S_i = -i_o \times \Delta i \quad (4)$$

$$S_j = -j_o \times \Delta j \quad (5)$$

Figure 7A:
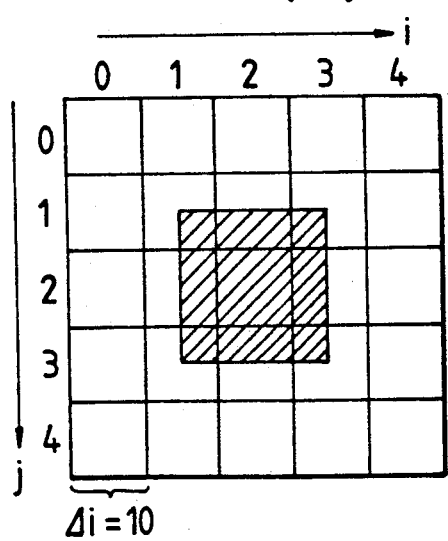
FIGS. 7(a) and 7(b) are diagrams of simplified examples of window regions of a registered fingerprint and an input fingerprint, for assistance in describing the second embodiment.
Figure 7B:
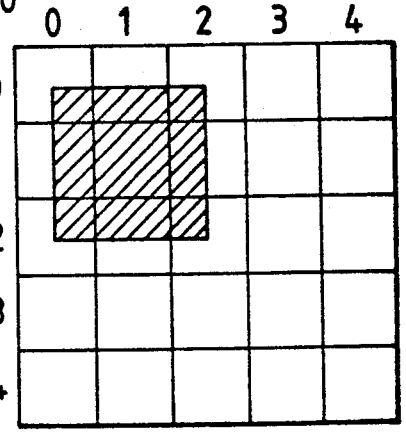

The above will be described in greater detail in the following. For simplicity of explanation, it will be assumed that the registered fingerprint image is as shown in FIG. 7(A), with only a single dark (i.e. "0" state) region appearing at the center of the fingerprint image as indicated by the cross-hatched region, and with the remainder of the fingerprint image being white (i.e. the "1" state) It will also be assumed that at the time of a subsequent verification operation, the input fingerprint image is of the form shown in FIG. 7(B). As shown, each fingerprint image is divided by five increments along the j axis and along the i axis respectively, for a total of 25 window segments. It will be assumed that each of these increments $\Delta j$ and $\Delta i$ corresponds to 10 pixels, i.e. each window segment consists of 100 pixels. The numeric arrays $P_V(i, j)$ and $P_R(i, j)$ are therefore respectively obtained as follows:

$$P_R(i,j) = \begin{bmatrix} 100 & 100 & 100 & 100 & 100 \\ 100 & 25 & 50 & 25 & 100 \\ 100 & 50 & 0 & 50 & 100 \\ 100 & 25 & 50 & 25 & 100 \\ 100 & 100 & 100 & 100 & 100 \end{bmatrix} \quad (6)$$

$$P_V(i,j) = \begin{bmatrix} 25 & 50 & 25 & 100 & 100 \\ 50 & 0 & 50 & 100 & 100 \\ 25 & 50 & 25 & 100 & 100 \\ 100 & 100 & 100 & 100 & 100 \\ 100 & 100 & 100 & 100 & 100 \end{bmatrix} \quad (7)$$

If no position shift of the registered fingerprint image relative to the input fingerprint image were to be executed, i.e. if values of zero are inserted in equation (1) above for each of $i_o$ and $j_o$, the corresponding position displacement function $S(0,0)$ would be obtained as follows:

$$S(0,0) = |25 - 100| + |50 - 100|$$
$$+ \ldots / 10 \times 10 \times 5 \times 5$$
$$= 700/2500 = 0.28$$

However if each of $i_o$ and $j_o$ is made equal to one, then a minimum value for the position displacement function is obtained as:

$$S(1, 1) = |25 - 25| + \ldots / 10 \times 10 \times 4 \times 4$$
$$= 0/1600 = 0$$

Thus, with $i_o = 1$ and $j_o = 1$, i.e. the values which minimize the position displacement function $S(i, j)$, the horizontal and vertical components $S_i$ and $S_j$ of the position displacement between the input fingerprint image and the registered fingerprint image are respectively obtained as:

$$S_i = -i_o \times \Delta i = -1 \times 10 = -10$$

$$S_j = -j_o \times \Delta j = -1 \times 10 = -10$$

Thus, it is judged that the amount of position displacement of the input fingerprint image relative to the registered fingerprint image is $-10$ pixels in the i-axis direction and $-10$ pixels in the j-axis direction.

Equation 1 above is equivalent to executing 2-dimensional density distribution comparison. Thus even in the case of a fingerprint image which is not clear, due factors such as breaks in the ridges of the print, the density distribution of the input fingerprint image will be identical to that of the registered fingerprint image (if the input fingerprint image is that of the registered individual). The amount of position displacement between the input fingerprint image and the registered fingerprint image can thereby be computed to a high degree of accuracy. In addition, counting of the pixels within each of the window segments into which a fingerprint image is divided can be executed by the image processing circuit 25 shown in FIG. 2, so that it is not necessary to add a special circuit for this purpose. Furthermore, the minimum value $S_{min}$ of the position displacement function $S(i_o, j_o)$ expresses a degree of approximation to a density distribution, and hence if this minimum value $S_{min}$ is above a fixed threshold value, it can be judged that the input fingerprint image is not that of the registered individual, and the verification application immediately rejected, with no further processing being required. Conversely, if the minimum value $S_{min}$ is below that threshold value, this indicates that it is not possible to make a definite decision at that stage, and so subsequent verification processing of the form described hereinabove for the first embodiment must then be executed. However at the start of such subsequent verification processing, the registered fingerprint image is initially shifted to compensate for the amount of position displacement $(S_i, S_j)$ that has been obtained as described above. In this way, any displacement of the input fingerprint image due to mis-positioning of the fingertip of the applicant is substantially compensated. Thus, the "search region" of the subsequent verification processing can be limited to a very small range of shifting of the registered fingerprint image window relative to the input fingerprint image, so that the processing time required for this can be shortened, by comparison with a method in which a large area of the input fingerprint image must be initially scanned to find a region of correspondence with the primary window region a of the registered fingerprint image.

Figure 8:
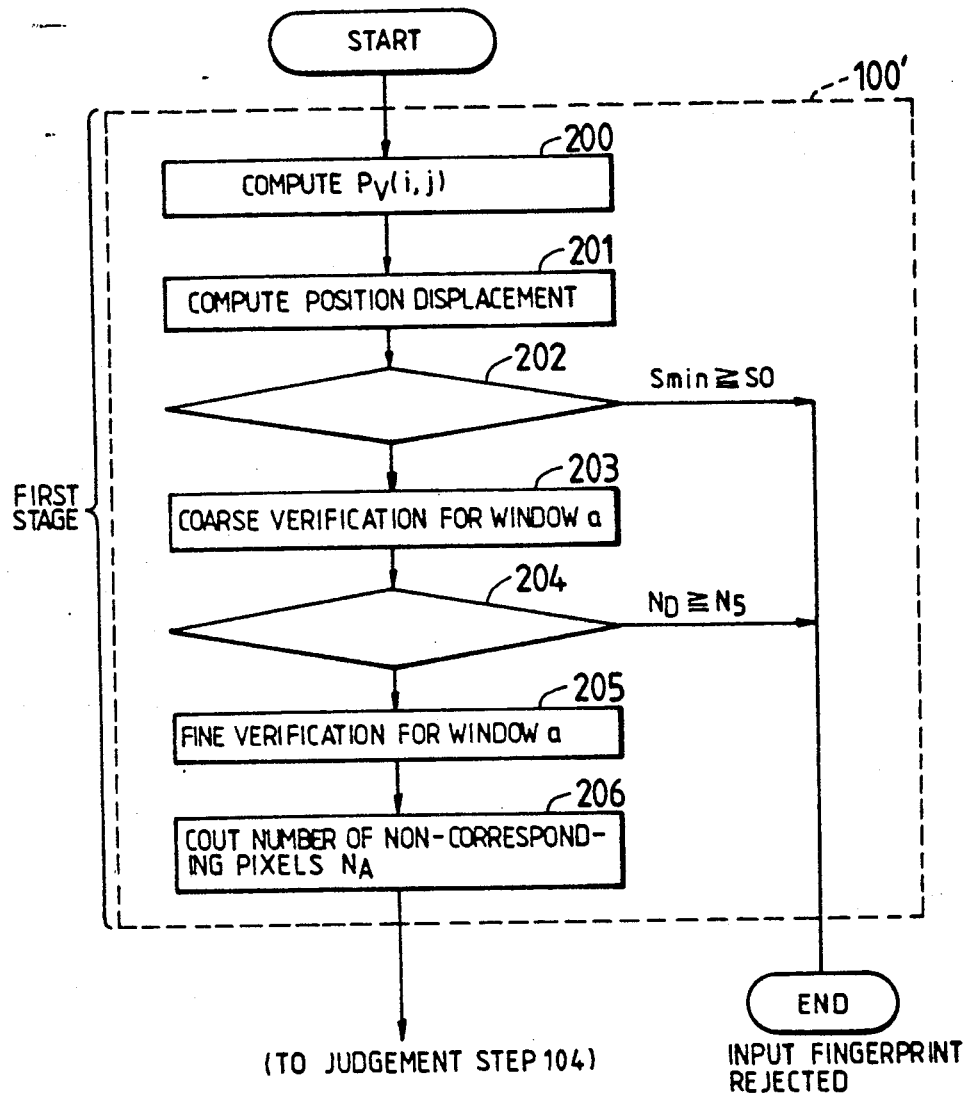
FIG. 8 is a flow chart for describing first-stage verification operation by the second embodiment.

FIG. 8 shows the operation flow of first-stage verification processing by this embodiment. Initially, a step 200 is executed whereby the numeric array $P_V(i, j)$ described above is obtained from the input fingerprint image. Prior to this processing, i.e. at the original time of registering the registered fingerprint image, the numeric array $P_R(i, j)$ has been obtained for the registered fingerprint and stored, and this is now read out from the floppy disc 29. In the next step, 201, the values of $S_i$ and $S_j$ which represent the amount of displacement of the input fingerprint image with respect to the registered fingerprint image are computed, i.e. the values which minimize the position displacement function $S(i_o, j_o)$. In addition, the minimum value of this position displacement function that results from these values $S_i$, $S_j$ is computed. This minimum value will be referred to in the following as $S_{min}$.

Next, in step 202, this value $S_{min}$ is compared with a judgement threshold value S0, and a decision is made as to whether $S_{min}$ is greater than S0. If it is greater, then this is judged to indicate that the input fingerprint image does not correspond to the registered fingerprint image, and the verification application is rejected, with no further processing being executed. If on the other hand $S_{min}$ is not greater than S0, then this indicates that a definite decision cannot be made at that stage, and the operation proceeds to step 203.

If there are a plurality of pairs of values for $i_o$ and $j_o$ each of which make $S(i_o, j_o)$ fall below the threshold value S0, i.e. pairs of values representing respectively different amounts of position displacement, then these different amounts of position displacement are obtained and successively utilized as "candidate" position displacement values as described hereinafter, in order of successively smaller values of $S(i_o, j_o)$.

In step 203, coarse verification processing of the window region a is executed, with the registered fingerprint image window a having been initially positioned relative to the input fingerprint image in accordance with the results of the preceding processing, i.e. displaced such as to compensate for misalignment of the input fingerprint image. (If a plurality of "candidate" displacements have been found as described above, then the displacements having the smallest value of $S(i_o, j_o)$ is first utilized). Coarse verification processing is then executed, as described hereinabove for step 101 of the first embodiment, by moving the registered fingerprint image window a in successive steps of magnitude substantially equal to ½ of the pitch between fingerprint ridges. In step 204, a judgement is made as to the result of this verification processing, based on the number of mutually non-corresponding pixels, i.e. in accordance with whether the number of mutually non-corresponding pixels between the primary window region a of the registered fingerprint image and the input fingerprint image, designated hereinafter as $N_D$, is greater than a judgement threshold value $N_5$. If the number of mutually non-corresponding pixels is greater than $N_5$, then the input fingerprint image is rejected. If there is only a single "candidate" displacement values, as described above, processing is then terminated. However if such a rejection occurs, and there are a plurality of candidate displacement values of the registered fingerprint image window a, then the window region a of the registered fingerprint image is moved to the position determined by the next one of these "candidate values", and the coarse verification processing step 203 described above is repeated.

If when coarse verification processing has been performed using all of the "candidate values" for the position displacement amount, it is found in each case that $N_D > N_5$, then it is judged that the input fingerprint image does not correspond, i.e. it is rejected, and processing is then terminated.

If it is found in step 204, after performing the coarse verification processing described above, that the number of mutually non-corresponding pixels $N_D$ is less than $N_5$, then processing proceeds to step 205 for fine verification processing. In step 205, with the registered fingerprint image window region a set in an initial position determined by the amount of position displacement found in the preceding steps, i.e. with the registered fingerprint image window a in a most closely correlated condition with respect to the input fingerprint image, fine verification processing in steps of pixels is executed in the same way as described hereinabove for step 102 in FIG. 5 of the first embodiment, to find a position of optimum correlation of the primary window region a of the input fingerprint image with respect to the input fingerprint image. The amount of position displacement that has been applied to the registered fingerprint image window a to reach that condition is then obtained and stored, and in the next step 206 the number of mutually non-corresponding pixels $N_A$ at that optimum position is counted.

The subsequent processing is identical to that described for the first embodiment, whereby a judgement step 104 is followed by the second-stage verification processing steps 105 to 108, if a definite decision is not made in step 104, i.e. if the number of number of mutually non-corresponding pixels $N_A$ is within the range N1 to N3 shown in FIG. 4.

The second embodiment described above provides the following advantages. Firstly, even if the input fingerprint image is of poor quality, the amount of position misalignment between the input fingerprint image and the registered fingerprint image can be very rapidly and accurately compensated by computing the numeric array values $S_i$, $S_j$ as described above. Furthermore if the input fingerprint image has a pattern that is substantially different from that of the registered fingerprint image, then in many cases the input fingerprint will be immediately rejected in step 202 and processing terminated, so that more rapid operation can be attained. In addition, if further coarse and fine verification processing is required, this need only be performed within a small "search region" of the input fingerprint image, due to the accurate positioning of the primary window region a which is achieved by the initial processing operations of steps 200, 201. Thus, this verification processing can be completed more rapidly than is possible with the first embodiment. Moreover, if the number of number of mutually non-corresponding pixels found after the step of coarse verification processing 203 is excessively high, then the input fingerprint image is immediately rejected and processing is terminated, so that this also leads to reduced time for verification.

In the embodiments of the invention described above, a primary window region a and secondary window regions b and c of the registered fingerprint are stored, and utilized respectively in first and second-stage verification processing. However it would be equally possible to further increase the reliability of verification by storing primary, secondary, and tertiary window regions of a registered fingerprint, and to execute first, second and third-stage processing respectively utilizing these window regions. If necessary, even greater numbers of window regions and correspondingly increased stages of processing could of course be used.

However, since the verification processing time will be increased in accordance with such an increase in the number of stages of verification processing, the number of stages should be determined in accordance with specific types of application.

What is claimed is:

1. A method of fingerprint verification in which fingerprint regions are processed as data representing pixel arrays, each pixel selectively taking a first state corresponding to a fingerprint ridge and a second state corresponding to a fingerprint valley, comprising steps of:

(a) providing a primary window region of a registered fingerprint image of a registered individual, said primary widow region being situated in a region of said registered fingerprint image, and at least one secondary window region of said registered fingerprint image, said secondary window region being at least partially outside said primary window region;

(b) providing an input fingerprint image which is to be verified for correspondence with said registered fingerprint image;

(c) executing first-stage verification processing by finding a region of said input fingerprint image which is configured in accordance with and has maximum correlation with said primary window region of the registered fingerprint image, and measuring a degree of said correlation, wherein the degree of correlation is related to the number of mutually non-matching pixels;

(d) making a judgement of said degree of correlation based on two predetermined thresholds that partition a range of possible correlation values into three intervals, and if said degree of correlation is judged to be within a first interval, accepting said input fingerprint image as corresponding to said registered fingerprint image and terminating processing, if said degree of correlation is judged to be within a second interval, rejecting said input fingerprint image and terminating processing, and if said degree of correlation is judged to be within a third interval such that a definite decision on acceptance or rejection of said input fingerprint image is difficult to attain, proceeding to second-stage verification processing;

(e) executing said second-stage verification processing by finding a second region of said input fingerprint image which is configured in accordance with and has maximum correlation with said secondary window region of the registered fingerprint image, and measuring a degree of said correlation; and (f) making a judgement of said degree of correlation in step (e) based on another threshold that partitions said range of possible correlation values into fourth and fifth intervals, accepting said input fingerprint image as corresponding to said registered fingerprint image if said degree of correlation of step (e) is within the fourth interval, and rejecting said input fingerprint image if said degree of correlation is within the fifth interval.

2. A method of fingerprint verification in which fingerprint regions are processed as data representing pixel arrays, each pixel selectively taking a first state corresponding to a fingerprint ridge and a second state corresponding to a fingerprint valley, comprising steps of:

(a) providing a primary window region of a registered fingerprint image of a registered individual, said primary window region being situated in a region of said registered fingerprint image, and at least one secondary window region of said registered fingerprint image, said secondary window region being at least partially outside said primary window region;

(b) providing an input fingerprint image which is to be verified for correspondence with said registered fingerprint image;

(c) executing first-level verification processing by finding a region of said input fingerprint image which is configured in accordance with and has maximum correlation with said primary window region of the registered fingerprint image, and measuring a degree of said correlation;

(d) making a judgement of said degree of correlation based on predetermined parameters and, if said degree of correlation is judged to be within a predetermined high range, accepting said input fingerprint image as corresponding to said registered fingerprint image and terminating processing, if said degree of correlation is judged to be within a predetermined low range, rejecting said input fingerprint image and terminating processing, and if said degree of correlation is judged to be within a range such that a definite decision on acceptance or rejection of said input fingerprint image is difficult to attain, proceeding to second-level verification processing;

(e) executing said second-level verification processing by finding a second region of said input fingerprint image which is configured in accordance with and has maximum correlation with said second window region of the registered fingerprint image, and measuring a degree of said correlation; and (f) making a decision as to acceptance or rejection of said input fingerprint image, based upon said degree of correlation obtained in said step (e);

in which said step (b) of first-level verification processing comprises comparing said primary window region of the registered fingerprint image with successively different regions of said input fingerprint image in successive position shifts of predetermined magnitude, to find a primary window region of said input fingerprint image which exhibits maximum correlation with said primary window region of said registered fingerprint image.

3. A method of fingerprint verification according to claim 2, in which said step (b) of first-stage verification processing comprises:

(a) executing said successive position shifts in steps of comparatively large magnitude, to find a first amount of displacement of said primary window region of the registered fingerprint image that provides maximum correlation with a primary window region of said input fingerprint image; and (b) executing said successive position shifts in steps of comparatively small magnitude, beginning from an condition of said primary window region of the registered fingerprint image being displaced by said first amount of displacement, to find a second amount of displacement of said primary window region of the registered fingerprint image that provides maximum correlation with a primary window region of said input fingerprint image.

4. A method of fingerprint verification according to claim 3 which said second amount of displacement of said primary window region of the registered fingerprint image is obtained as a displacement to a position relative to said input fingerprint image such that any movement from said position in either of two mutually perpendicular pixel array direction will result in a greater number of number of mutually non-corresponding pixels than a number of number of mutually non-corresponding pixels between said primary window region of the registered fingerprint image and said input fingerprint image which exists at the current position of said primary window region.

5. A method of fingerprint verification according to claim 3, in which said steps of comparatively large magnitude are of substantially greater magnitude than an array pitch of said pixels, and in which said steps of comparatively small magnitude are substantially identical in magnitude to said pixel pitch.

6. A method of fingerprint verification according to claim 2, in which said judgement as to whether correlation is within said high range is executed by counting a number of mutually non-corresponding pixels between said primary window region of the registered fingerprint image and said input fingerprint image and judging whether said number is below a first judgement threshold value, said judgement as to whether correlation is within said low range is executed by judging whether said number of number of mutually non-corresponding pixels is above a second judgement threshold value which is higher than said first judgement threshold value, and said judgement as to whether correlation is in a range which makes a definite decision difficult is executed by judging whether said number of mutually non-corresponding pixels is between said first and second judgement threshold values.

7. A method of fingerprint verification according to claim 2, in which said step (b) of first-stage verification processing comprises steps of:
   (a) expressing said registered fingerprint image and said input fingerprint image as respective patterns of density distribution of pixels which are in a predetermined one of said first and second states thereof, and
   (b) computing said amount of displacement of said registered fingerprint image based on differences between said respective patterns of density distribution.

8. A method of fingerprint verification according to claim 2, in which said step (b) of first-stage verification processing comprises steps of
   (a) dividing said registered fingerprint image and input fingerprint image into respective rectangular arrays of window segments, utilizing rectangular coordinate axes i and j, each said window segments comprising a rectangular array of $\Delta i$ pixels along the direction of said i axis by $\Delta j$ pixels along the direction of said j axis; and
   (b) counting respective numbers of pixels which are in said predetermined one of the first and second states within said window segments of said registered fingerprint image and said input fingerprint image, to obtain said density distribution patterns as respective numeric arrays $P_R(i, j)$ and $P_V(i, j)$ of values of said numbers of pixels; and, computing respective values $i_o$ and $j_o$ for a position displacement function $S(i_o, j_o)$ which produce a minimum value for said position displacement function, said position displacement function being expressed as:

$$S(i_o, j_o) = f\{P_V(i, j) - P_R(i+i_o, j+j_o)\}$$

and in which said amount of displacement is obtained as respective amounts of displacement $S_i$ and $S_j$ along said i and j axes, expressed as:

$$S_i = -i_o \times \Delta i, \text{ and}$$

$$S_j = -j_o \times \Delta j.$$

9. A method of fingerprint verification in which fingerprint regions are processed as data representing pixel arrays, each pixel selectively taking a first state corresponding to a fingerprint ridge and a second state corresponding to a fingerprint valley, comprising steps of:
   (a) providing a primary window region of a registered fingerprint image of a registered individual, said primary window region being situated in a region of said registered fingerprint image, and at least one secondary window region of said registered fingerprint image, said secondary window region being at least partially outside said primary window region, and providing an input fingerprint image which is to be verified for correspondence with said registered fingerprint image;
   (b) executing a first-stage verification processing by comparing said primary window region of the registered fingerprint image with said input fingerprint image to find an amount of displacement of said primary window region of the registered fingerprint image from an initial position thereof which results in a maximum degree of correlation with a correspondingly positioned primary window region of said registered fingerprint image, wherein the degree of correlation is related to the number of non-matching pixels;
   (c) judging, based on two thresholds that partition a range of possible correlation values into three intervals, whether said degree of correlation is within a first interval, and if so, accepting said input fingerprint image as corresponding to said registered fingerprint image and terminating processing, judging whether said degree of correlation is within a second interval, and if so, rejecting said input fingerprint image and terminating processing, and judging whether said degree of correlation is within a third interval, and if so, proceeding to second-stage verification processing;
   (d) executing said second-stage verification processing by applying said amount of displacement found in said step (b) to shift said secondary window region of said registered fingerprint image to an initial displaced position, then comparing said secondary window region of the registered fingerprint image with said input fingerprint image to find an amount of displacement of said secondary window region of the registered fingerprint image from said initial displaced position thereof which results in a maximum degree of correlation with said input fingerprint image; and
   (e) making a judgement of said degree of correlation in step (d) based on another threshold that partitions said range of possible correlation values into a fourth and fifth intervals, accepting said input fingerprint image as corresponding to said registered fingerprint image if said degree of correlation of step (d) is within the fourth interval, and rejecting said input fingerprint image if said degree of correlation is within the fifth interval.

* * * * *